US012584281B2

(12) United States Patent (10) Patent No.: US 12,584,281 B2

Sego (45) Date of Patent: Mar. 24, 2026

(54) ANIMAL WASTE COLLECTION SYSTEM

(71) Applicant: SHEILD WALL ARMS LLC, Albuquerque, NM (US)

(72) Inventor: Eric Sego, Albuquerque, NM (US)

(73) Assignee: SHEILD WALL ARMS LLC, Albuquerque, NM (US)

( * ) Notice: Subject to any disclaimer, the term of this patent is extended or adjusted under 35 U.S.C. 154(b) by 1015 days.

(21) Appl. No.: 17/720,983

(22) Filed: Apr. 14, 2022

(65) Prior Publication Data

US 2022/0333323 A1 Oct. 20, 2022

Related U.S. Application Data

(60) Provisional application No. 63/330,248, filed on Apr. 12, 2022, provisional application No. 63/175,433, filed on Apr. 15, 2021.

(51) Int. Cl.
E01H 1/12 (2006.01)
A01D 7/00 (2006.01)

(52) U.S. Cl.
CPC ............. E01H 1/1206 (2013.01); A01D 7/00 (2013.01); *E01H 2001/1226* (2013.01); *E01H 2001/1266* (2013.01); *E01H 2001/128* (2013.01)

(58) Field of Classification Search
CPC .......... E01H 1/1206; E01H 2001/1226; E01H 1/1266; E01H 1/128; A01D 7/00
USPC .................................................. 294/1.3, 176
See application file for complete search history.

(56) References Cited

U.S. PATENT DOCUMENTS

| | | | |
|---|---|---|---|
| 333,888 A | 1/1886 | Perry |
| 405,828 A | 6/1889 | Card |
| 425,695 A | 4/1890 | Pontious |
| 486,066 A | 11/1892 | Abrams |
| 501,430 A | 7/1893 | Knight |
| 643,386 A | 2/1900 | Smith |
| 726,040 A | 4/1903 | Flechtheim |
| 744,333 A | 11/1903 | Goodline |
| 902,187 A | 10/1908 | Warrenfeltz |
| 1,000,912 A | 8/1911 | Hooker |
| 1,200,092 A | 10/1916 | Elliott et al. |
| 1,224,349 A | 5/1917 | Yessne |
| 1,349,582 A | 8/1920 | Peterson |
| 1,471,929 A | 10/1923 | Jerome |
| 1,580,600 A | 4/1926 | Holbrook |
| 1,669,302 A | 5/1928 | Lanman |
| 2,287,133 A | 6/1942 | Reiter |
| 2,427,486 A | 9/1947 | Wyland |
| 2,440,934 A | 5/1948 | De Vol |
| 2,525,090 A | 10/1950 | Victor |
| 2,782,435 A | 2/1957 | Stone |
| 2,984,850 A | 5/1961 | Law et al. |
| 2,999,259 A | 9/1961 | Sheldon |
| 3,002,209 A | 10/1961 | Mckinstry |
| 3,308,613 A | 3/1967 | Orden |

(Continued)

*Primary Examiner* — Paul T Chin
(74) *Attorney, Agent, or Firm* — LOZA & LOZA, LLP; Kevin L. Soules

(57) ABSTRACT

A waste collection system, method, and apparatus comprises a handle assembly comprising a stand tube, a handle, and a controller; and a waste collection assembly comprising a housing, a waste slide container, and a sliding arm bar operably connected to a waste catch with a linear actuator, wherein the waste catch is configured to draw waste into the waste slide container.

20 Claims, 16 Drawing Sheets

100

(56)                References Cited

U.S. PATENT DOCUMENTS

| | | | |
|---|---|---|---|
| 3,478,500 | A | 11/1969 | Rhoads |
| 3,668,730 | A | 6/1972 | Scharmann et al. |
| 3,757,737 | A | 9/1973 | Drum et al. |
| 3,959,922 | A | 6/1976 | Leistikow |
| 3,986,744 | A | 10/1976 | Krogstad et al. |
| 4,196,928 | A | 4/1980 | Spangler |
| 4,200,321 | A | 4/1980 | Warkentin |
| 4,201,409 | A | 5/1980 | O'Hara |
| 4,209,870 | A | 7/1980 | Doyel |
| 4,243,259 | A | 1/1981 | Wright |
| 4,323,272 | A | 4/1982 | Fortier |
| 4,368,907 | A | 1/1983 | Ross |
| 4,741,566 | A | 5/1988 | Byung-Do et al. |
| 4,765,666 | A | 8/1988 | Parks |
| 4,966,400 | A | 10/1990 | Hull et al. |
| 5,269,575 | A | 12/1993 | Parvaresh |
| 5,318,330 | A | 6/1994 | Dombrowski |
| 5,540,470 | A * | 7/1996 | Lu ......................... E01H 1/1206 294/1.4 |
| 5,667,264 | A | 9/1997 | Tanahara |
| 5,671,959 | A | 9/1997 | Tsou |
| 5,820,179 | A | 10/1998 | Tsou |
| 6,019,405 | A | 2/2000 | Tsou |
| 6,095,579 | A | 8/2000 | Nichols |
| 6,113,166 | A | 9/2000 | Wynn |
| 6,135,520 | A | 10/2000 | Miller et al. |
| 6,260,895 | B1 | 7/2001 | Nichols |
| 6,641,188 | B2 | 11/2003 | Arceo |
| 6,796,587 | B2 | 9/2004 | Tsou |
| 7,044,520 | B2 * | 5/2006 | Roberson, Jr. ........... A01B 1/02 294/55.5 |
| 7,270,157 | B2 | 9/2007 | Perkitny |
| 8,201,863 | B1 | 6/2012 | Konovalov |
| D663,906 | S | 7/2012 | Pallant |
| 8,449,007 | B2 * | 5/2013 | Farmer ................. E01H 1/1206 294/1.4 |
| 8,474,890 | B2 | 7/2013 | Buhagiar |
| 8,827,334 | B2 * | 9/2014 | Endara .................. E01H 1/1206 294/1.4 |
| 10,244,677 | B2 * | 4/2019 | Texidor ................... A01D 7/10 |
| 10,520,966 | B2 * | 12/2019 | Veda ....................... H02J 13/00 |
| 10,655,289 | B1 | 5/2020 | Kelly et al. |
| 11,866,896 | B2 * | 1/2024 | Patel ..................... E01H 1/1206 |
| 11,873,611 | B2 * | 1/2024 | Robichaux ........... A01K 23/005 |
| 2002/0038957 | A1 * | 4/2002 | Harrison ................ E01H 1/008 294/1.4 |
| 2018/0179713 | A1 * | 6/2018 | Casey ................... E01H 1/1206 |

* cited by examiner

1200

1225

1220

1210

1215

1205

1200

1230

1238

1236

1234

135

1234

ANIMAL WASTE COLLECTION SYSTEM

CROSS REFERENCE TO RELATED PATENT APPLICATIONS

The present application claims the priority and benefit under 35 U.S.C. § 119(e) of U.S. Provisional Patent Application Ser. No. 63/175,433 filed Apr. 15, 2021, entitled "WASTE COLLECTION SYSTEM." U.S. Provisional Patent Application Ser. No. 63/175,433 is herein incorporated by reference in its entirety.

The present application also claims the priority and benefit under 35 U.S.C. § 119(e) of U.S. Provisional Patent Application Ser. No. 63/330,248 filed Apr. 12, 2022, entitled "WASTE COLLECTION SYSTEM." U.S. Provisional Patent Application Ser. No. 63/330,248 is herein incorporated by reference in its entirety.

TECHNICAL FIELD

Embodiments are generally related to waste collection. Embodiments are further related to the field of pet waste collection. Embodiments are further related to methods, systems, and apparatuses for the sanitary collection and disposal of pet waste.

BACKGROUND

Pet waste is an unpleasant reality of pet ownership. Most domestic animals defecate at least once a day. Pet droppings are unpleasant to collect and can create sanitary hazards. Most current pet waste collection systems rely on a shovel or other such scooping mechanism. However, most of these solutions include an extended lever arm that makes the tool difficult to handle, particularly for those unable to shoulder the associated torque. Likewise, the use of multiple devices simultaneously may be required. This unwieldy process is difficult for many pet owners.

Other solutions include the manual collection of waste using plastic hand coverings or bags. This requires close contact with fecal matter and is prone to fecal contamination when the bag or covering integrity has been compromised by pin holes, tears, or other such defects.

Accordingly, there is a need in the art for systems and methods designed to reduce the physical burden of pet waste collection and to reduce fecal contamination, as provided in the disclosed embodiments.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a waste collection system.

It is another aspect of the disclosed embodiments to provide a pet waste collection device.

It is another aspect of the disclosed embodiments to provide systems and methods for sanitary collection of pet waste and other such waste.

It is another aspect of the disclosed embodiments to provide a mechanically operated waste collection device that reduces the physical burden of waste collection.

In certain embodiments, the disclosed pet waste device comprises a new process to rake up and dispose of pet waste. The device can be placed directly in front of animal feces and a raking mechanism is used to collect the feces, while leaving most foreign object or debris in place. The system draws the feces into a storage bin that allows for easy disposal into a sack or refuse container. In certain embodiments a bag can be attached to the back side for easy collection.

The disclosed automated device is designed to require only one hand and allows the operator to use one hand for operation while leaving a free hand to simultaneously complete other tasks.

The disclosed automated process provided by this device allows the operator to use one hand to both rake and collect the feces. A rake fixture can be driven in a circle such that the rake falls on the forward stroke coming down in the revolution in order to collect feces and pull it back into the container.

In certain embodiments, the device can include a self-contained illumination source to allow for direct illumination of the target feces without the use of an additional hand operated light.

In certain embodiments, a waste collection system comprises a shovel housing, a shovel slide, a waste catch, and a drive train operably connected to a power supply and configured to drive the waste catch through a series of positions. In an embodiment the waste collection system further comprises a handle and at least one controller for operating the drive train, wherein the controller is configured on the handle. In an embodiment the waste collection system further comprises at least one wheel configured on the shovel housing. In an embodiment the waste collection system further comprises a light bank configured on the shovel housing. In an embodiment the waste collection system further comprises at least one door configured on the shovel housing. In an embodiment the waste collection system comprises a waste catch with a plurality of fingers. In an embodiment the waste collection system further comprises a half cylinder with a flat side of the half cylinder affixed to the platform and a curved portion of the cylinder facing away from the platform.

In an embodiment, a waste collection system comprises a shovel housing, a shovel slide, a waste catch, and a drive train operably connected to a power supply and configured to drive the waste catch through a series of positions.

In an embodiment, the system comprises a handle and at least one controller for operating the drive train, wherein the controller is configured on the handle. In an embodiment, the system comprises at least one wheel configured on the shovel housing. In an embodiment, the system comprises a light configured on the shovel housing. In an embodiment, the system comprises at least one door configured on the shovel housing. In an embodiment, the waste catch further comprises a plurality of fingers. In an embodiment, the system comprises at least one speaker on the shovel housing. In an embodiment, the system comprises a guide arm operably connected to the waste catch, the guide arm configured to guide motion of the waste catch.

In an embodiment, the power supply comprises a battery. In an embodiment, the system further comprises a 120 Volt AC charging cable configured to connect to the battery.

In another embodiment a waste collection system comprises a handle assembly comprising: a stand tube, a handle, and a controller; and a waste collection assembly comprising: a housing, a waste slide container, a sliding arm bar operably connected to a waste catch with a linear actuator, wherein the waste catch is configured to draw waste into the waste slide container.

In an embodiment, the system comprises a printed circuit board configured to control movement of the linear actuator. In an embodiment, the system comprises a light configured on the housing. In an embodiment, the system comprises a speaker configured on the housing. In an embodiment, the system comprises a solenoid operably connected to the sliding arm bar. In an embodiment, the system comprises a wheels link connecting the waste collection assembly to at least one wheel. In an embodiment, the system comprises a stepper motor configured to raise and lower the wheels link and the wheels. In an embodiment, the system comprises a rake joint connecting the sliding arm bar to the waste catch.

In another embodiment a system comprises a handle, a stand tube connected to a housing, a waste slide container, and a waste catch configured to draw waste into the waste slide container. In an embodiment, the system comprises a controller, a printed circuit board in operable communication with the controller and configured to control movement of the waste catch, and a power source.

It will be appreciated that the methods and systems can be achieved according to the embodiments disclosed herein.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
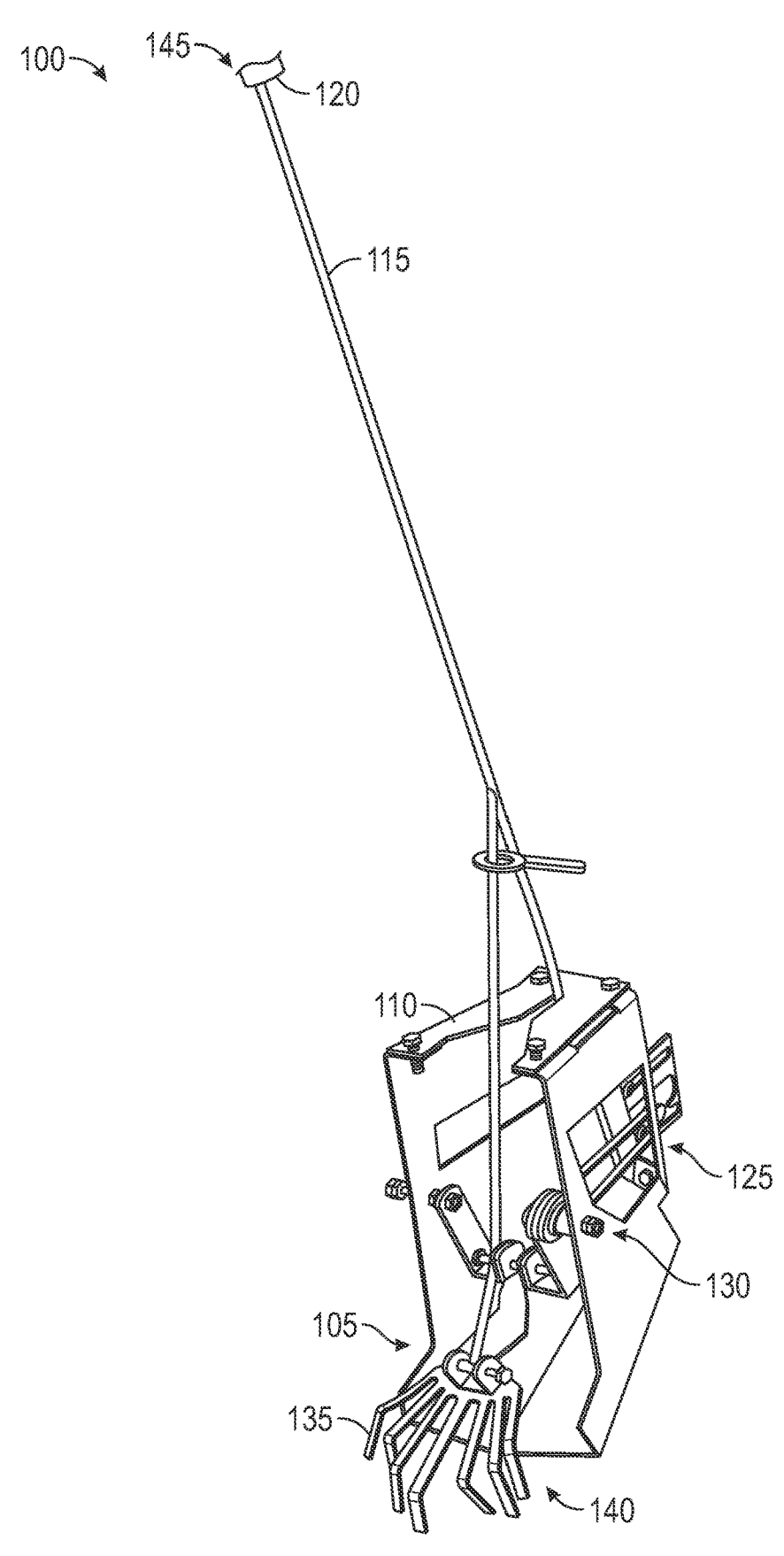
FIG. 1 depicts a waste collection system, in accordance with the disclosed embodiments.

The particular values and configurations discussed in the following non-limiting examples can be varied, and are cited merely to illustrate one or more embodiments, and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

The disclosed embodiments are directed to a system and/or apparatus for the collection of waste. The system generally comprises a shovel slide and integrated waste catch configured to engage with one another to pull waste into a receptacle. The system further includes a stand and handle that allows the user to position the device for waste collection.

FIG. 1 illustrates a waste collection system 100 in accordance with an exemplary embodiment. The waste collection system 100 can comprise a shovel slide 105 connected to a shovel housing 110. The shovel housing 110 can be connected to a stand 115 and handle 120. A motor 125 and drive train assembly 130 can be mounted to the shovel housing 110 which can be operably connected to a waste catch 135. The motor 125 and drive train assembly 130 can be used to drive the waste catch 135.

In operation, the system 100 can be arranged with waste proximate to the lip 140 of the shovel slide 105. The waste catch 135 can then be activated with a control 145 (optionally configured on the handle) to deploy the waste catch 135 beyond the waste and pull it onto the shovel slide 105. The waste catch 135 is configured to draw the waste to a receptacle at the rear of the waste slide 105 for collection.

Figures 2A, 2B:
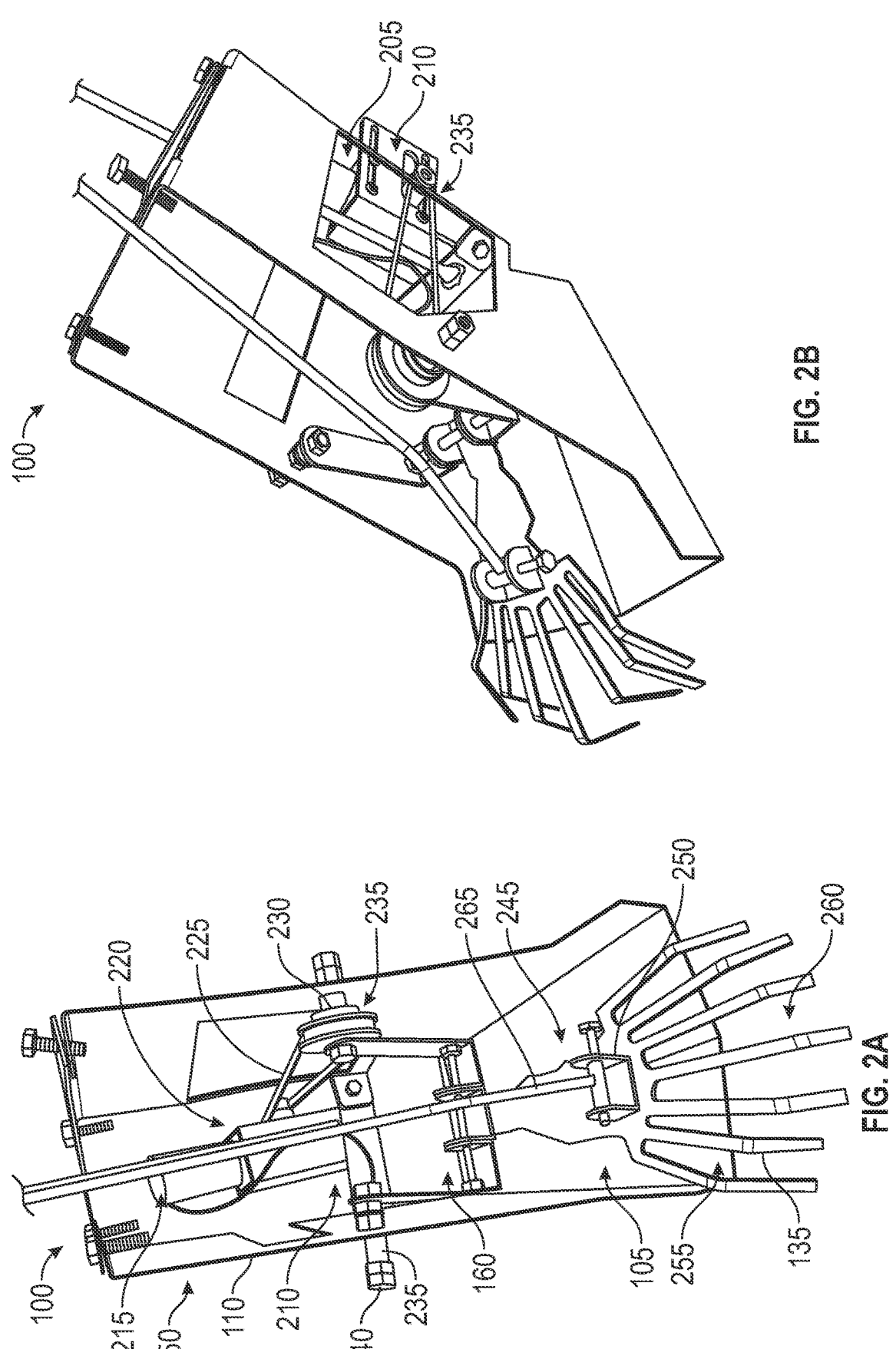
FIG. 2A depicts another view of a waste collection system, in accordance with the disclosed embodiments.
FIG. 2B depicts another view of a waste collection system, in accordance with the disclosed embodiments.

FIGS. 2A and 2B illustrate front and side views of the lower portion 150 of the system 100 in accordance with the disclosed embodiments. As illustrated, the shovel housing 110 can be connected to the shovel slide 105 creating walls on the sides of the shovel slide 105 to prevent waste from exiting over the sides 155.

Figure 3:
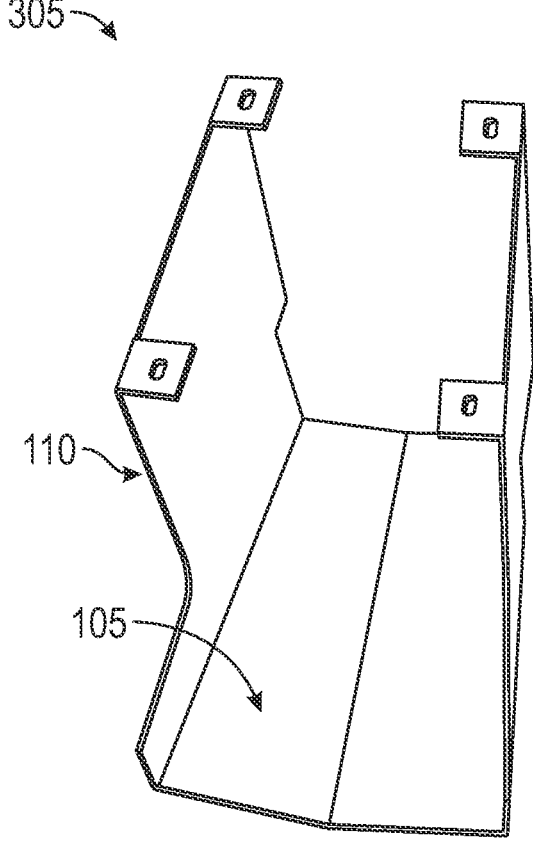
FIG. 3 depicts a shovel housing associated with a waste collection system, in accordance with the disclosed embodiments.

In certain embodiments, the shovel slide 105 and shovel housing 110 can comprise a single molded metal shape 305 as illustrated in FIG. 3. The bottom of the shovel slide 105 or shovel housing 110 can be flat so that it can rest on the surface below. The lip 140 of the shovel slide 105 can be declinated slightly to form a connection with the ground below to allow objects to roll or slide onto the shovel slide 105. In other embodiments, other configurations can be used.

The shovel housing 110 can be open along the rear of the shovel slide 105. In certain embodiments, the system 100 can be fitted with a receptacle, bag, or other such collection point for the collection of waste drawn off the back of the shovel slide 105 by the waste catch 135.

In other embodiments, the shovel housing 110 can include a fitting or connection for non-permanent connection of a bin, bag, or other such collection means. The bag attachment can be configured to connect with a fabric/green material (cleanable), plastic, or paper bag. In such embodiments, the bag can drag behind rear of the shovel slide. In certain embodiments, the attached bag length can vary from short to long and the bag length can be selectable/adjustable by the user.

A disposable or replaceable sanitary plate (not shown) can be configured to fit over the shovel slide 105. The sanitary plate can be removed and cleaned and/or replaced, to reduce fecal contamination. In certain embodiments, a drag plate can be connected to the rear of the shovel slide. The collection bin or bag can be configured to rest on the drag plate so that hazards on the ground do not catch or puncture the bin or bag.

In certain embodiments, the shape of the shovel slide 105 can be selected to facilitate the deposit of waste into the bag or receptacle connected to the opening 160 at the rear of the shovel housing 110. This can include, but is not limited to a downward sloping angle of the shovel slide 105 from the point where the waste catch 135 deposits the waste to the back opening 160 of the shovel housing 110.

Figure 6:
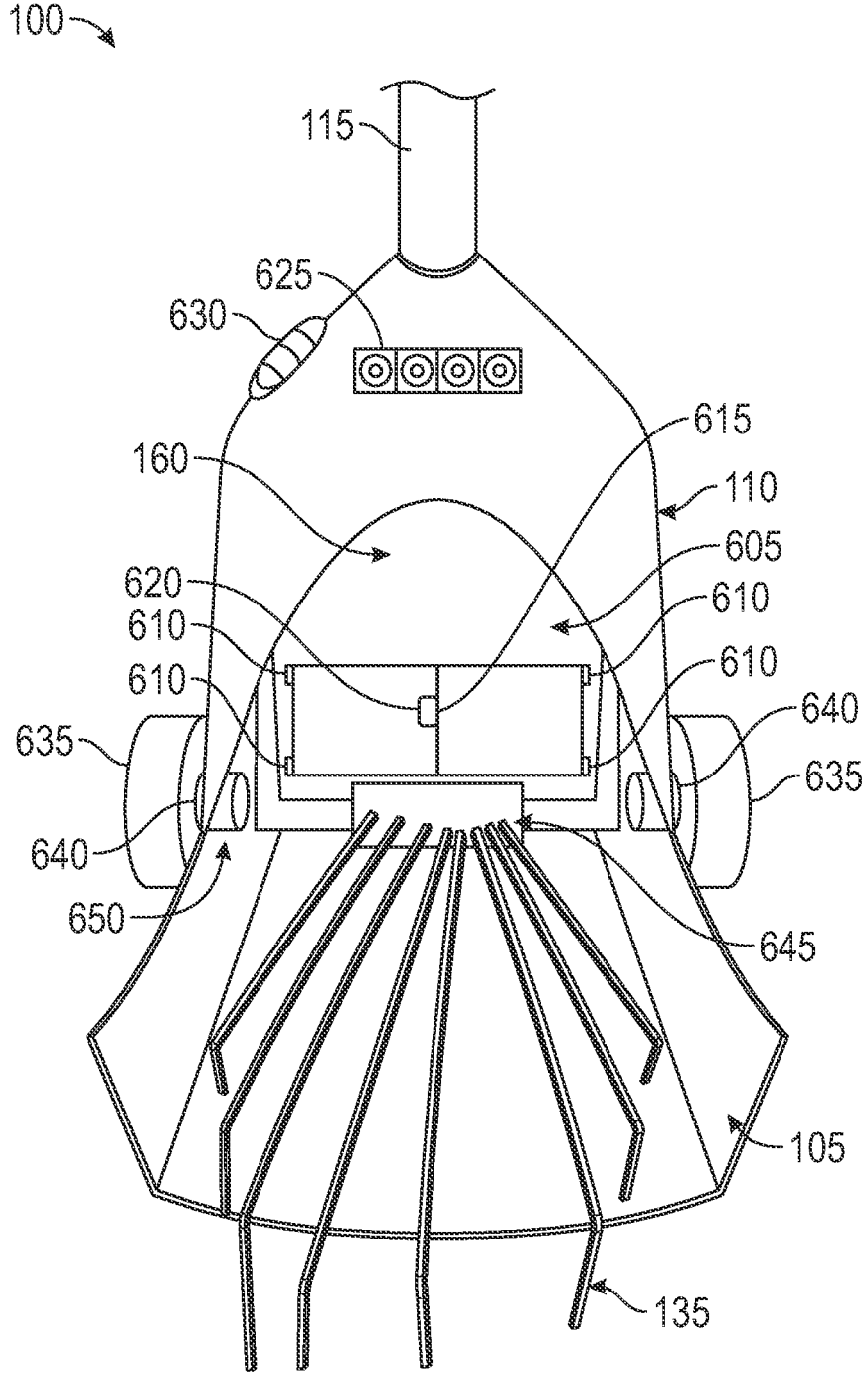
FIG. 6 depicts a front view of an embodiment of a waste collection system, in accordance with the disclosed embodiments.

In certain embodiments, the rear of the shovel housing 110 can include a door 615 that can be opened and closed to allow waste to pass through. FIG. 6 illustrates one such door assembly 605, with the door edges mounted to the shovel housing via hinges 610 or other such connections. The door 615 can be controlled by either an electrical or mechanical mechanism.

For example, in certain embodiments, a magnet 620 can be used to hold opposing sides of the door 615 together in a closed position. The magnet 620 can comprise an electro-magnet and can be released via a magnetic field induced by electric current. When the magnetic connection is released, the hinges 610 in the door 615 can open. In certain embodiments, the hinges 610 can be spring biased to open when the magnetic connection between the doors 615 is released.

In certain embodiments, control of the door 605 mechanism can be configured on the handle 120. In certain embodiments, the controls 145 can be configured at the top of the handle 120. When waste dispensation is required, a handle mounted near the connection of the handle can be used to tilt the system 100 to the desired angle. The door 615 can then be opened, releasing the waste into a trash can, bag, or other such final waste receptacle.

As illustrated in FIG. 2A and FIG. 2B, the walls of the shovel housing 110 can include access apertures 205 on either side of the shovel housing 110 to provide access to the operational aspects of the system 100. A motor mount 210 can be configured between the walls of the shovel housing 110. The motor mount 210 can be configured to hold a motor 125 and power supply 215. In certain embodiments, the power supply 215 can comprise a battery or AC power connection.

The motor 125 can comprise a DC motor, stepper motor, servo motor, brushed motor, or brushless motor, configured for imparting rotary motion, linear motion, reciprocating motion, and/or oscillating motion. In certain embodiments, the drive train 130 can comprise a driving gear 220 connected by a drive belt 225 to an operating gear 230. The drive belt 225 can comprise a rope, band, pulley, linkage, or other such device. In certain embodiments, the operating gear 230 can be larger than the driving gear 220.

The operating gear 230 can be mounted to the shovel housing 110 near the front of the shovel slide 105. The operating gear mounting arrangement can include a shaft 235 and bearing assembly 240 which allows the operating gear 230 to turn the shaft 235. The shaft 235 can be mounted between the two walls of the shovel housing 110 with bearings, or other such system which allow the shaft 235 to turn.

It should be noted that the motor 125 and drive train assembly 130 illustrated in FIGS. 1-4 is exemplary and in other embodiments the motor and drive train assembly can be configured in other ways. For example, in certain embodiments, a gear/sprocket system can be driven by a belt or other such apparatus to transfer the power and impart movement. This can include shafts and couplings, power screws, cams, and/or linkages. In certain embodiments, track systems can be used to drive the waste catch. In other embodiments vertical drives or wheel trains can be used. Such embodiments may require gearing and gear transmission. Brakes and/or clutch systems can be incorporated in the drive system as necessary. In certain embodiments, the systems can further include speed reducers, torque limiters, torque converters, torque amplifiers, and or overload protectors.

The waste catch 135 can be rotatably mounted to the shaft via a catch arm 245 and one or more shaft mounts 250. The shaft mounts 250 can comprise apertures, or apertures fitted with bearings, that allow the catch arm 245 to rotate. The catch arm 245 is fitted to connect with fingers 255 of the waste catch 135. The fingers 255 of the waste catch 135 can resemble the shape of a rake in a spade pattern or other such desired shape. This pattern is selected to improve catch accuracy and effectively contain waste caught by the waste catch 135. The fingers 255 can comprise generally horizontal extension with downward bending ends or tips. The fingers 255 can thus come together, forming a cone shaped basket 260 to ensure the catch and draw of waste is effective.

The end of the catch arm 245 where the arm connects to the fingers 255 can be fitted with a rotating mount, which is, in turn connected to a guide arm 265. The guide arm 265 is configured to draw the waste catch 135 through a generally circular movement cycle.

Figure 4:
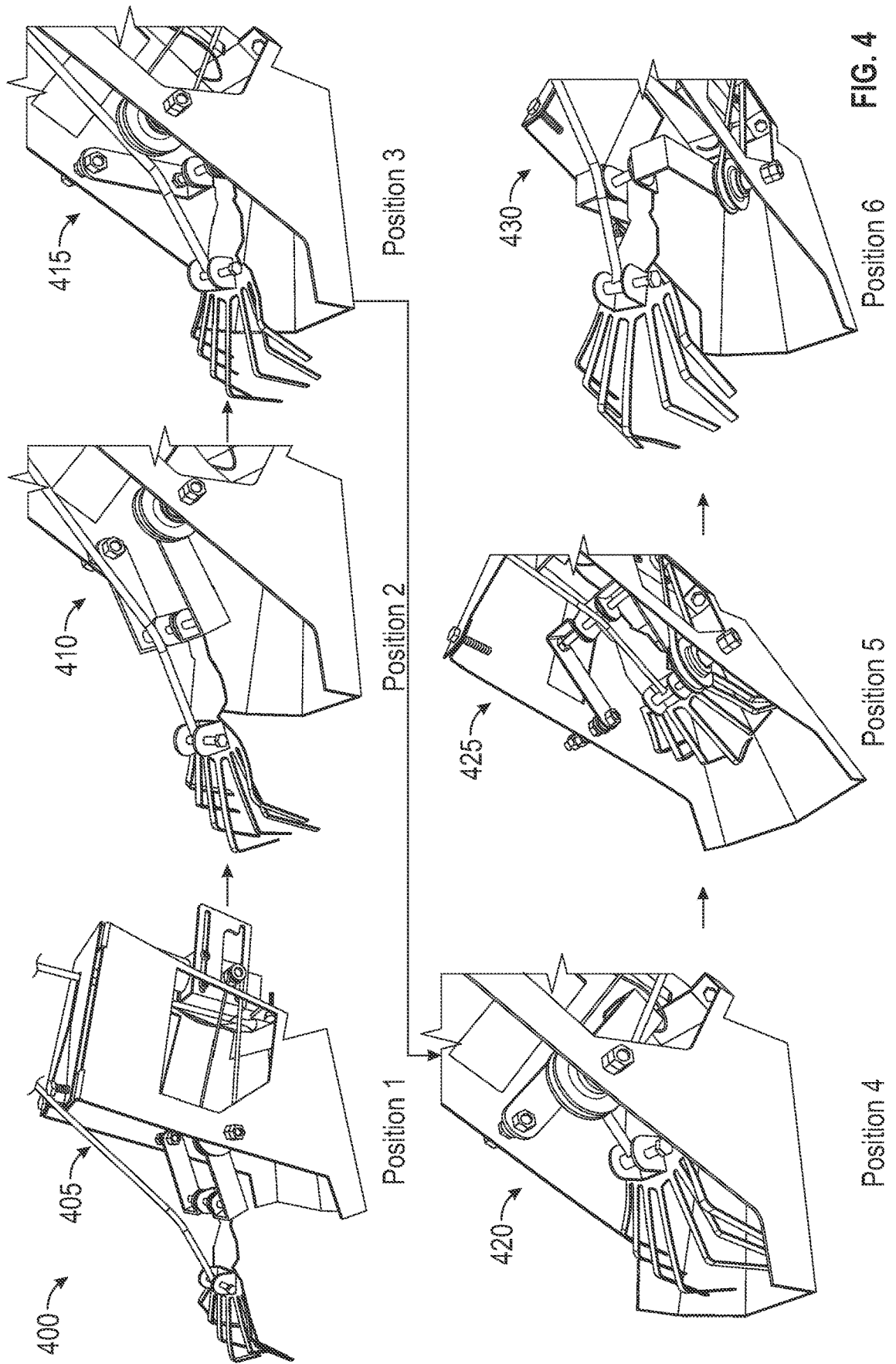
FIG. 4 depicts waste catch positions associated with a waste collection system, in accordance with the disclosed embodiments.

This movement cycle 400 is illustrated in FIG. 4. In practice the cycle starts in position 1 as shown at 405. As the motor drives the shaft, the guide arm lowers the fingers of the waste catch from an elevated position to a forward most extended position 2 as shown at 410. In the forward most extended position 2, the fingers are extended beyond the front lip of the waste slide and are in contact with the collection surface. In this position, the system is arranged such that the waste is between the fingers and the lip of the shovel slide.

In position 3, illustrated at 415, the rotation of the drive train, and the guide bar draw the waste catch in a substantially horizontal direction toward the lip of the shovel slide, collecting the waste in the process. At position 4, shown at 420, the waste catch continues its substantially horizontal path onto the shovel slide, drawing the waste onto the shovel slide. At position 5, the waste catch pushes the waste to the rear of the shovel slide for collection in the associated waste receptacle as shown at 425. Finally, at position 6, as shown at 430, the waste catch lifts away from the shovel slide and back toward its elevated starting position 1, for redeployment.

Figure 5:
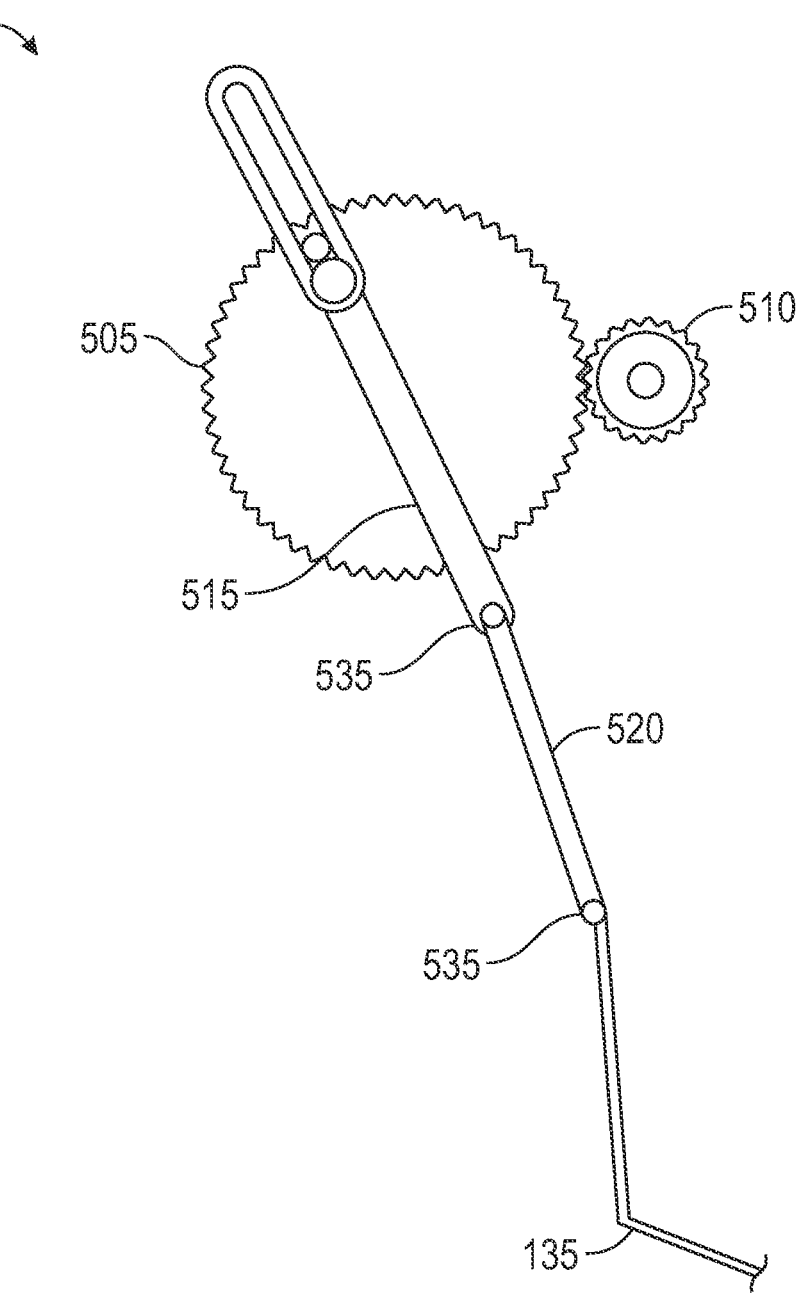
FIG. 5 depicts a gear based drive associated with a waste collection system, in accordance with the disclosed embodiments.

In certain embodiments, an optimized angle system 500 can be used to control the attitude of the waste catch 135. For example, as illustrated in FIG. 5, a gear 505 can control the movement of the waste catch 135 using a driving sprocket 510, and action bar 515 connecting the arm 520 to the waste catch 135 via pivots 525, keeping it at the optimal angle throughout the rotation of the arm. In another embodiment, a spring mechanism can be used to control the movement of the rake, keeping it at the optimal angle throughout the rotation of the arm.

FIG. 6 illustrates various aspects of the disclosed embodiments. In the embodiment illustrated in FIG. 6 the shovel housing 110 can be equipped with a light bank 625. In certain embodiments, the light bank 625 can comprise one or more LED lights, incandescent lights, or other such lights. In other embodiments, the light bank 625 can comprise an adjustable mount configured for the insertion of a flashlight. The adjustable mount can adjust to the size of a flashlight. In certain embodiments, the light bank 625 can be adjusted to cast a beam of light in a desired direction. The lights associated with the light bank 625 can be powered by the power supply 215 associated with the system 100.

In addition, the shovel housing 110 can also include a speaker 630. The speaker 630 can comprise, for example, a blue tooth connected speaker, wireless speaker, wired speaker, or other such speaker, the speaker can be configured to connect to the user's cell phone or other audio output system. The speaker 630 can draw power from the power supply 215.

FIG. 6 further illustrates that, in certain embodiments, the system 100 can be configured with one or more wheels 635. The wheels 635 can be mounted to the shovel housing 110 with dowels affixed to race and bearing arrangements 640. The wheels 635 can be configured to turn independently, or can both be affixed to one axel. In certain embodiments, the motor can be further connected to the wheels 635 to drive the wheels 635 easing the task of pushing the system 100 from one location to the next.

As illustrated in FIG. 6, an alternative mechanism for driving the waste catch 135 is illustrated. In such embodiments, the waste catch arm 645 is connected to a reciprocating arm 650. The reciprocating arm 650 can be generally u-shaped with the waste catch arm 645 configured in the center of the u-shaped reciprocating arm 650. A drive train assembly, as detailed herein, can be used to rotate the reciprocating arm 650 such that the waste catch 135 generally follows the pattern of movement as described in FIG. 4.

Figure 7:
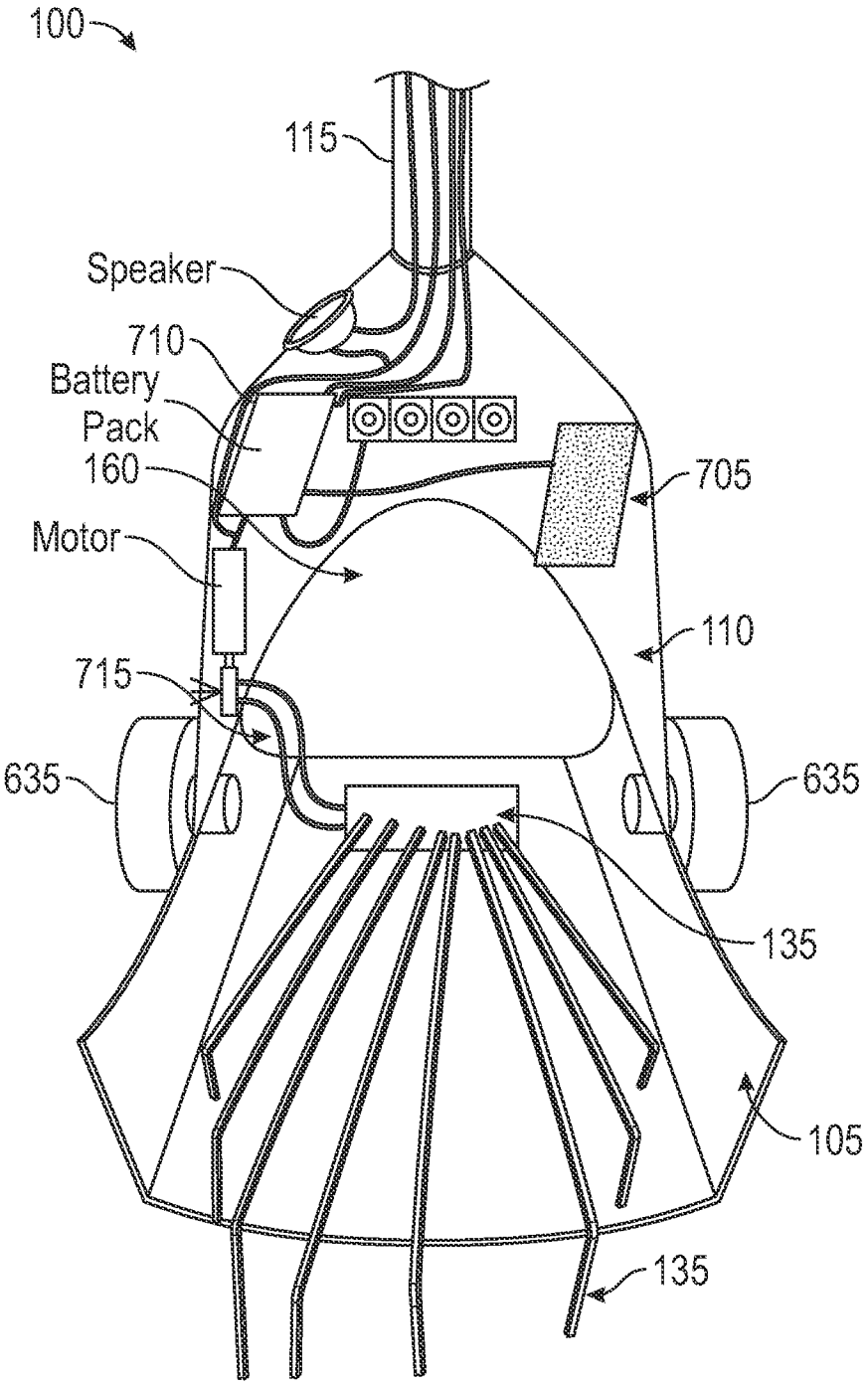
FIG. 7 depicts aspects of a driving mechanism as an embodiment of a waste collection system, in accordance with the disclosed embodiments.

FIG. 7 illustrates additional aspects of the embodiments disclosed herein. In the embodiment illustrated in FIG. 7, the reciprocating arm 715 comprises a connection on only one side of the shovel housing 110 as opposed to both sides, as illustrated in FIG. 6. Furthermore, FIG. 7 details wiring configurations for power supply and control lines associated with the motor, power supply, light bank, and speaker. In certain embodiments, the power supply can provide power to a resistive heating element configured in the handle of the system.

FIG. 7 further illustrates the addition of a photovoltaic panel 705. The photovoltaic panel 705 can be connected to the battery pack 710 or power supply of the system 100. The photovoltaic panel 705 can be used to convert sunlight on the panel into energy which can be stored in the battery pack 710.

Figure 8A:
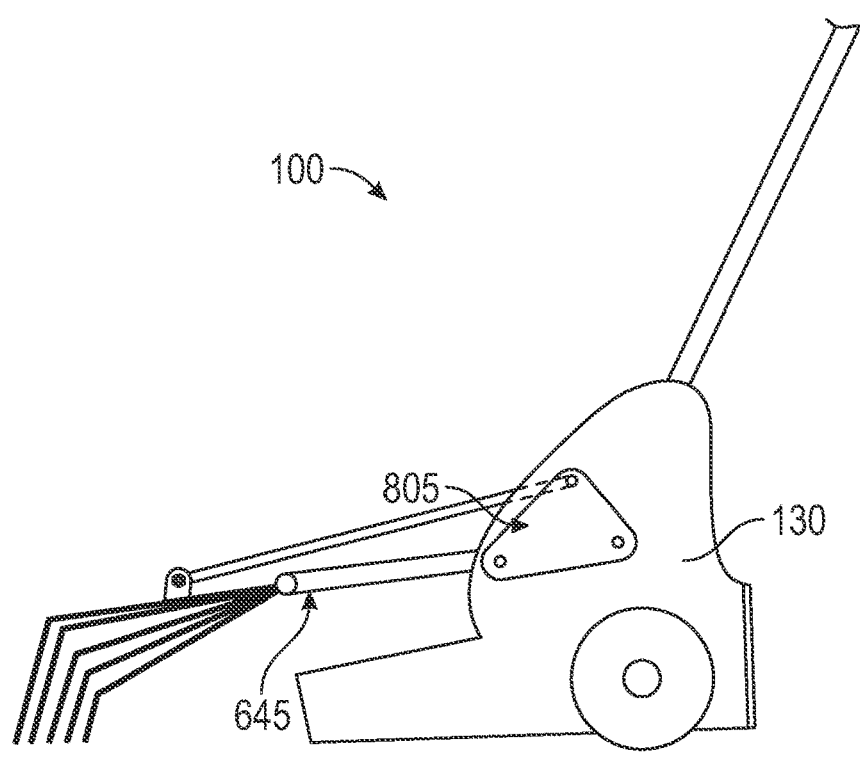
FIG. 8A depicts an embodiment of a waste catch mechanism associated with a waste collection system, in accordance with the disclosed embodiments.
Figure 8B:
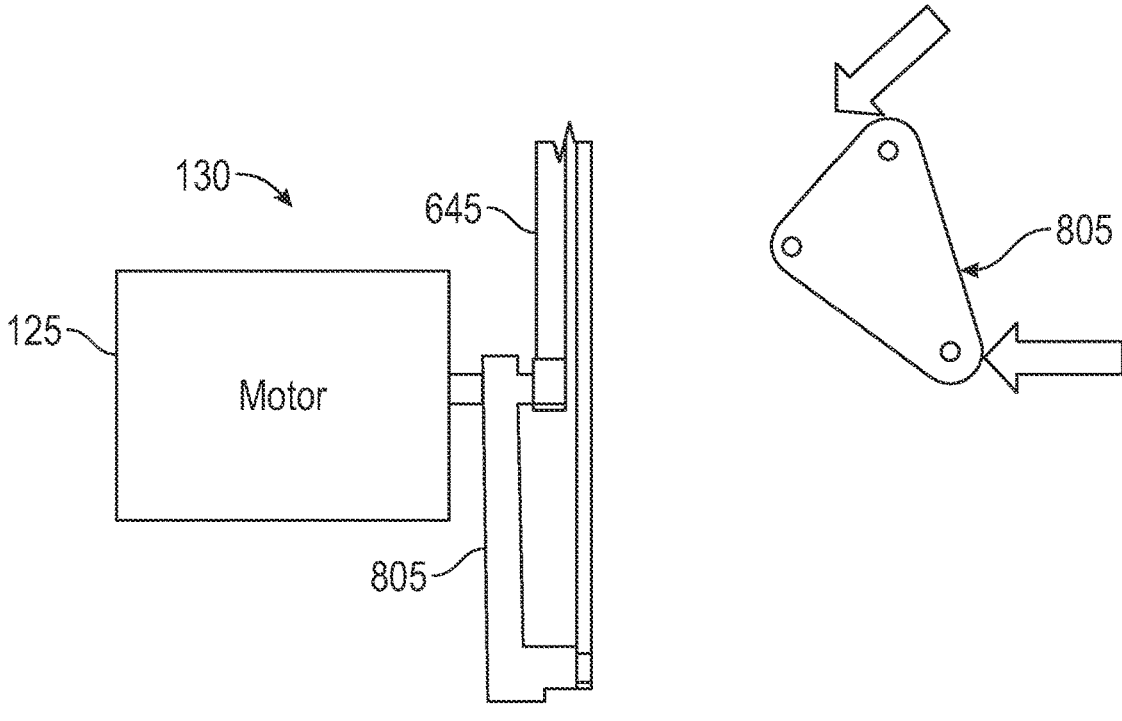
FIG. 8B depicts additional aspects of a waste catch mechanism associated with a waste collection system, in accordance with the disclosed embodiments.

FIG. 8A and FIG. 8B, illustrates another drive mechanism for the waste catch in accordance with the disclosed embodiments. In certain embodiments, the drive train 130 can be used to drive a driver plate 805. The driver plate 805 can comprise a generally triangular plate that is mounted at one vertex to the waste catch arm 645 and at another of the vertex to the control arm. The third vertex is configured to attach to the drive train 130 such that the driver plate 805 rotates around that vertex. A front perspective view is provided in FIG. 8B to further illustrate the principle associated with the embodiment.

Figure 13:
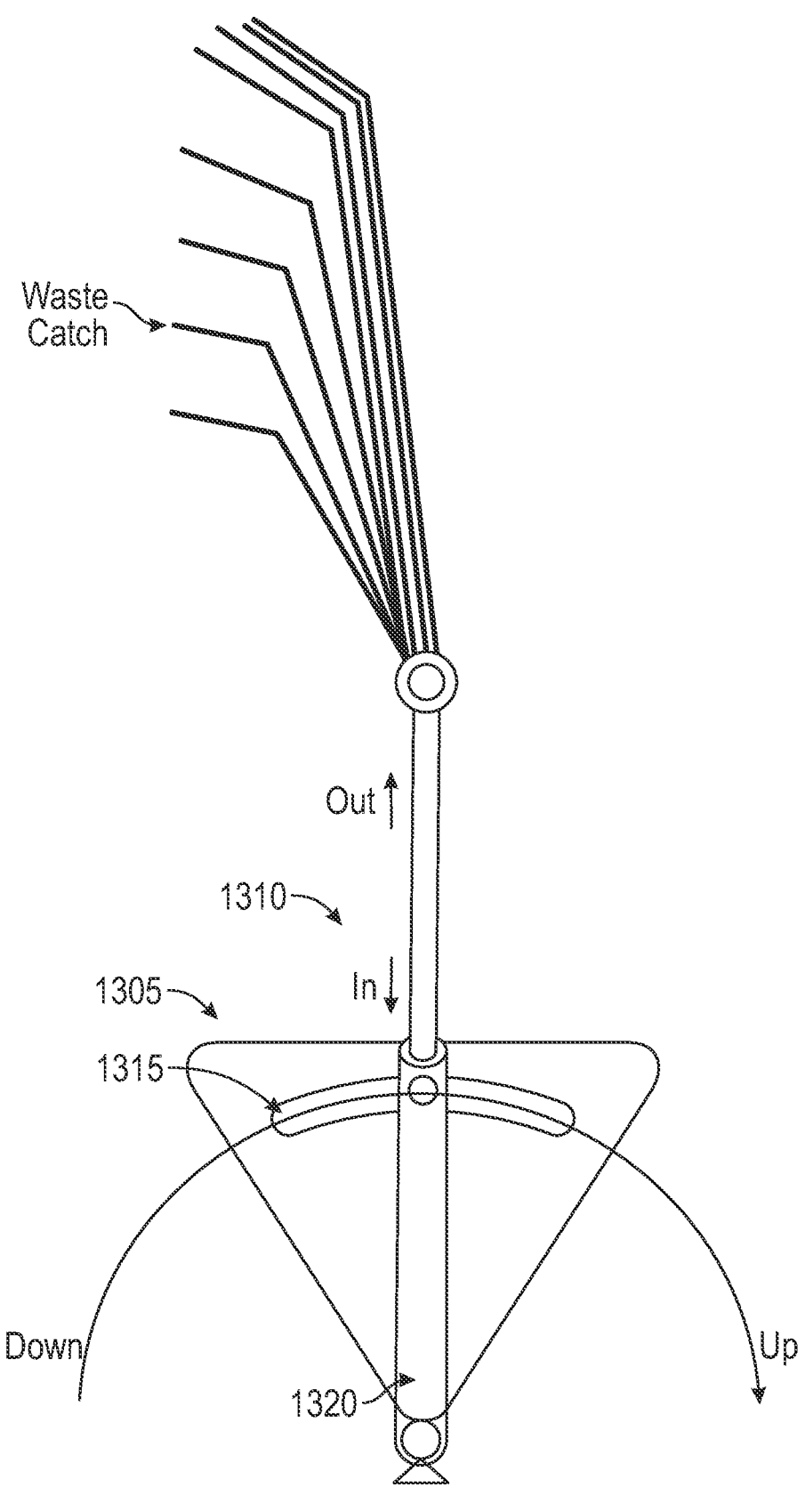
FIG. 13 depicts a piston mechanism for the waste catch, in accordance with the disclosed embodiments.

FIG. 13, illustrates an alternative drive mechanism 1300 for the waste catch 135 disclosed herein. In such an embodiment, a mounting plate 1305 can be affixed to a piston arm 1310. The mounting plate 1305 can further be configured with a slide 1315. The slide 1315 allows the attitude of the piston arm 1310 to be adjusted up and down, while the piston 1320 drives the piston arm 1310 in and out. These two mechanisms can work in concert to drive the motion of the waste catch 135 through a rotational pattern to draw waste into the shovel housing 110.

Various wheel configurations can be implemented as aspects of the disclosed embodiments. FIGS. 9A-9F illustrate various implementations in accordance with the disclosed embodiments.

Figures 9A, 9B:
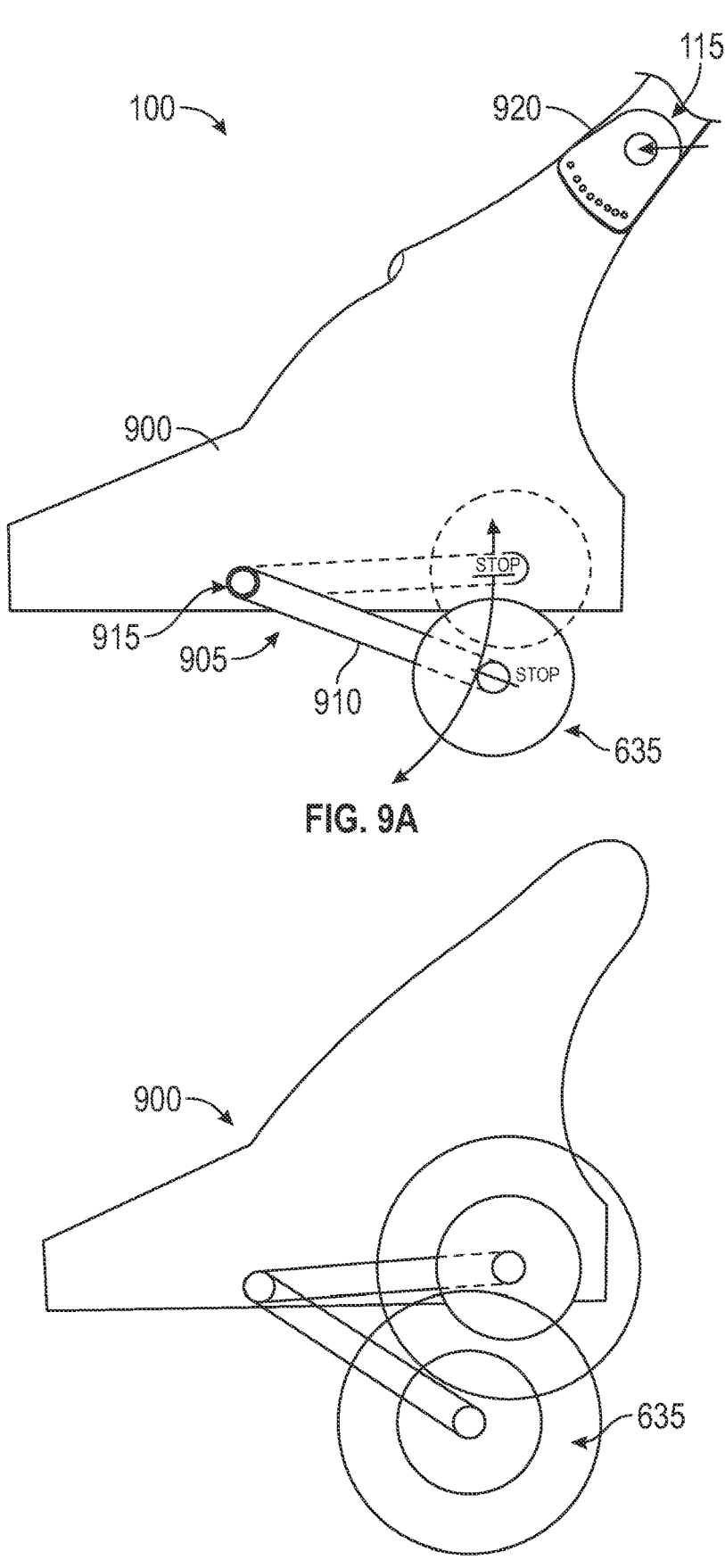
FIG. 9A depicts aspects of a wheel assembly associated with a waste collection system, in accordance with the disclosed embodiments.
FIG. 9B depicts aspects of the wheel assembly associated with a waste collection system, in accordance with the disclosed embodiments.

FIG. 9A illustrates a simple version of a wheel system 900 that allows the waste collection system 100 to pivot. In such embodiments, one or more wheels 635 can be mounted to a wheel pivot 905. The wheel pivot 905 can have a pivot point 915 toward the front of the shovel housing 110. A wheel 635 and associated tire assembly can be mounted to the distal end of a pivot bar 910 attached at the pivot point 915. A stop can be configured on the exterior of the pivot bar 910 as well as on the inside of the shovel housing 110 so that the wheel 635 can rotate downward from the pivot point 915 but stops when the pivot stops meet. When the pivot stops meet the wheel 635 will be in contact with the ground so that the system 100 can be rolled from one place to another.

As illustrated in FIG. 9A, the system 100 can further include a descending mount 920 which allows the slope of the stand 115 to be adjusted for user comfort. The descending mount 920 can include a pin and pin aperture arrangement about which the handle can be rotated. FIG. 9B illustrates a view of the assembly with the wheels in a raised and lowered position for reference. The control handle can be used with larger wheels and/or tires that have better clearance, advantageously allowing the system 100 to move over uneven terrain.

Figure 9C:
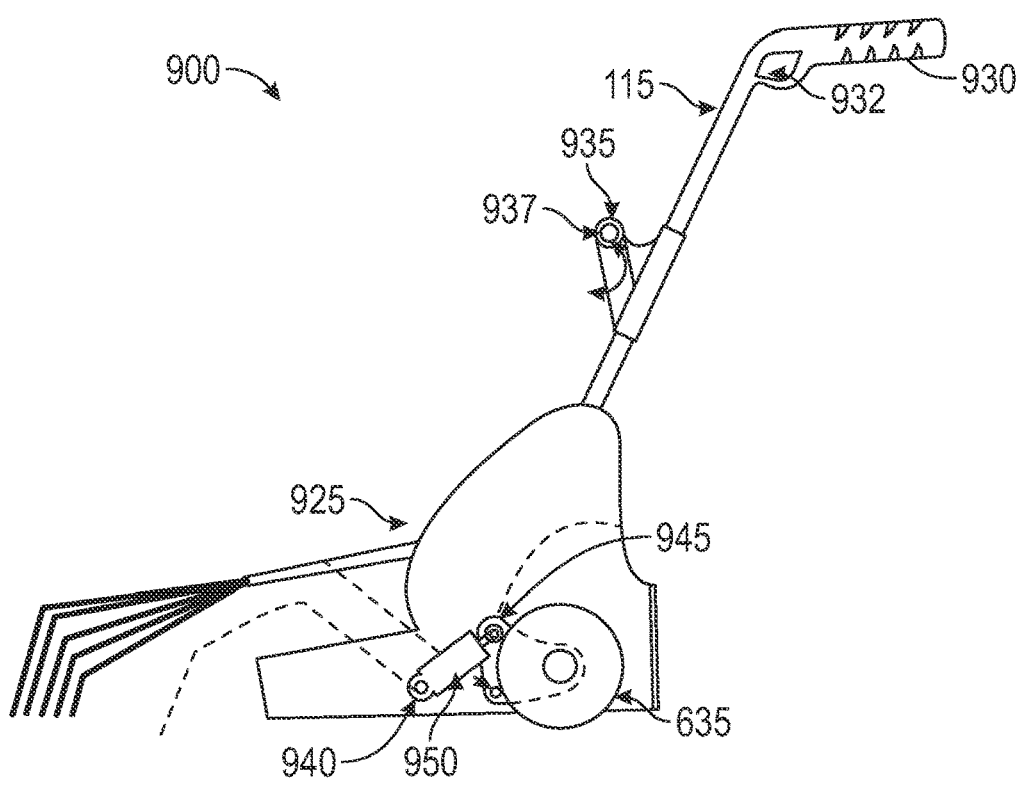
FIG. 9C depicts aspects of another wheel assembly associated with a waste collection system, in accordance with the disclosed embodiments.

FIG. 9C illustrates another embodiment of a wheel system 925 in accordance with the disclosed embodiments. Among other features, FIG. 9C illustrates a handle 930 mounted to the stand 115, and configured with a release trigger 932. It should be appreciated that, in other embodiments, other variations of the handle 930 may exist. Control for the movement of the waste catch 135 can be configured on the handle 930. In certain embodiments, a speed control wheel or other type of variable speed control can be provided on the handle 930.

The handle 935 can provide a mechanism, such as a trigger 937, to facilitate handsfree dumping of waste out the back of the device. In certain embodiments, the waste catch can include a restrictor or restricting device to keep the rake at the correct angle throughout each revolution.

Furthermore, the pivot point 940 illustrated in FIG. 9C connects with a swing arm/cam 945 which can rotate to let the wheels 635 move down. The swing arm/cam 945 is secured at the pivot point to the shovel in conjunction with the piston device 950 to move the wheels up and down easily. In certain embodiments, the piston device 950 is attached to the shovel but can spin freely in accordance with how it is secured. The piston 950 (or other such driver) can be driven into an extended position to let the wheels 635 will move down. The lower wheel position offers better ground clearance for transportation of varied terrain.

In another embodiment the system can employ a hydraulically activated drive piston and connection rod that will lower or raise the associated shaped pivoting wheel mounting plate into position by its movement either extending or retracting the drive piston and connecting rod. The wheels are reset into a higher position by physically pushing down on the device until the wheel mounting plate is forced back into the up position. The thumb latch can be used to hold the desired position, while compressing the hydraulic piston.

In another embodiment the system can include an electrically activated drive piston and connection rod that will lower or raise the associated pivoting wheel mounting plate into position either extending or retracting the drive piston and connecting rod. The wheels are reset into a higher position by physically pushing down on the device until the wheel mounting plate is forced back into the desired position and setting the thumb latch and compressing the hydraulic piston.

In another embodiment the device has a charged hydraulic piston and rod that will lower the associated shaped pivoting wheel mounting plate into position by releasing a mechanical catch via a thumb latch. The wheels can be reset into a higher position by physically pushing down on the device until the wheel mounting plate is forced back into the up position setting the thumb latch and compressing the hydraulic piston.

Figure 9D:
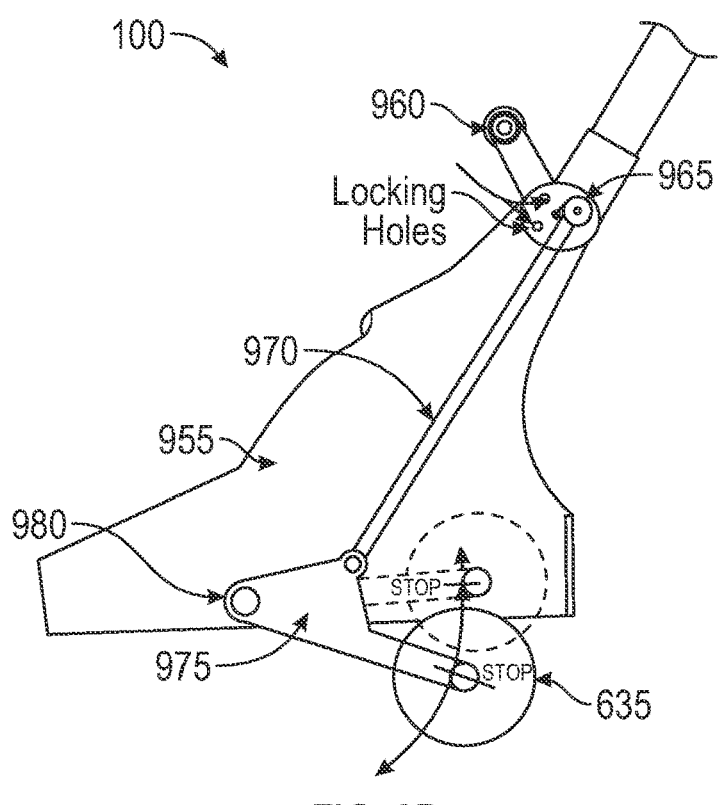
FIG. 9D depicts aspects of another wheel assembly associated with a waste collection system, in accordance with the disclosed embodiments.
Figure 9E:
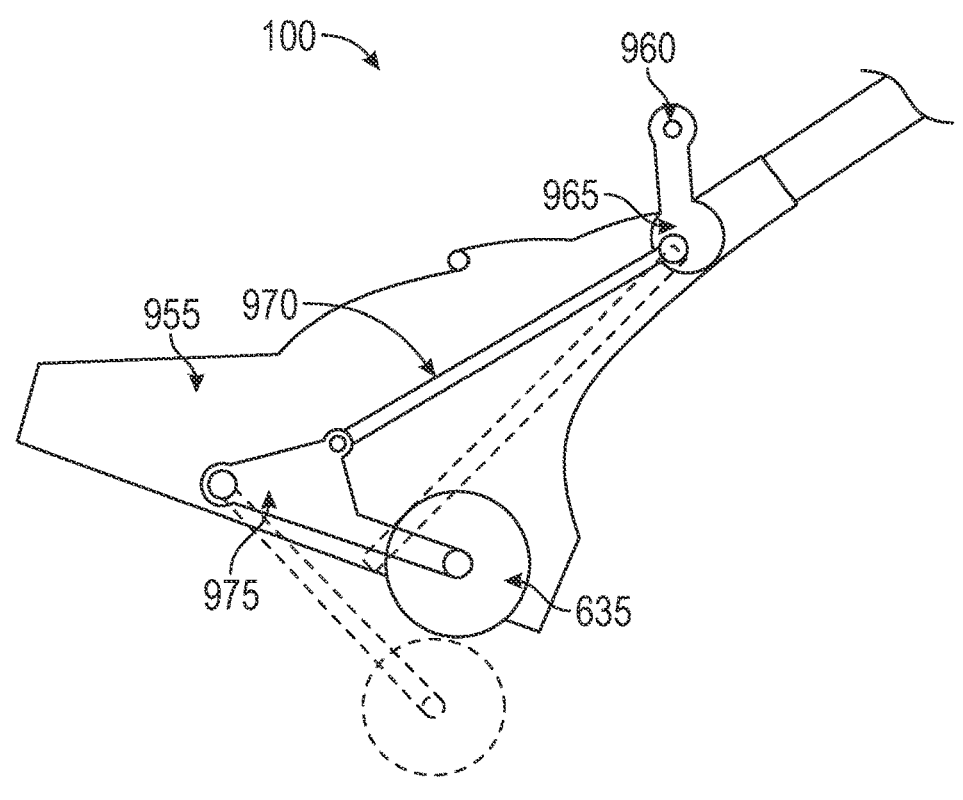
FIG. 9E depicts aspects of the wheel assembly associated with a waste collection system, in accordance with the disclosed embodiments.

FIGS. 9D and 9E illustrate another embodiment of a wheel adjustment system 955 in accordance with the disclosed embodiments. In the embodiment, a lever 960 can be configured in the handle. The lever 960 is mechanically engaged to a rotating disc 965 fitted with a riser bar 970. The riser bar 970 extends to a wheel mounting plate 975. The wheel mounting plate 975 is connected to the wheel shovel at a pivot point 980. The lever 960 is configured to turn the rotating disc 965 which in turn, pulls or pushes the wheel mounting plate 975 up or down. The wheel 635 mounted on the end of the wheel mounting plate 975 is thus deployed or retracted accordingly.

When the wheels 635 are in the raised position, a portion of the wheel remains in contact with the ground so that it can be moved by titling it backward, and then rolling it forward. The wheels 635 can be lowered to provide additional mobility over larger or more significant obstacles. With the wheels deployed, dumping form the rear of the device is also much simpler.

In an embodiment a spring-loaded trigger can be configured in or on the top handle of the system. Operation of the trigger can release a mechanical catch holding a spring-loaded dump door that is held in place on the back of the waste holding area by a hinge and mechanical catch as detailed in FIG. 6. After the waste has been dumped from the holding area, the spring-loaded dump door can be closed manually, until the catch is re-engaged. In other embodiments the spring-loaded trigger can be located somewhere other than the top handle of the device and would be operated by a mechanical linkage. In another embodiment the spring-loaded trigger can be located somewhere other than the top handle of the device and can be operated via a remote electrical signal.

It should be appreciated that, in some embodiments one or more motors can drive and power the waste catch 135 operation and one or more motors can drive and power the wheel operation.

In another embodiment multiple drive arms can be attached to a single motor via a drive gear or sprocket. These drive arms are connected to the drive gear or sprocket on a bearing or series of bearings at the same attachment point to achieve varied throw and torque for each drive arm. One arm driving the wheels while another drives the rake mechanism.

In another embodiment multiple drive arms of different lengths and offset can be attached to a single motor via a drive gear or sprocket sequentially on a series of staggered connection points via bearings. Each connection is staggered a further distance from the center of the drive gear or sprocket to achieve varied throw, torque, and speed (RPM's) for each drive arm each without interfering with the operation of the other. One driving the wheels while another drives the rake mechanism leaving a third to drive an auxiliary function.

Figure 10:
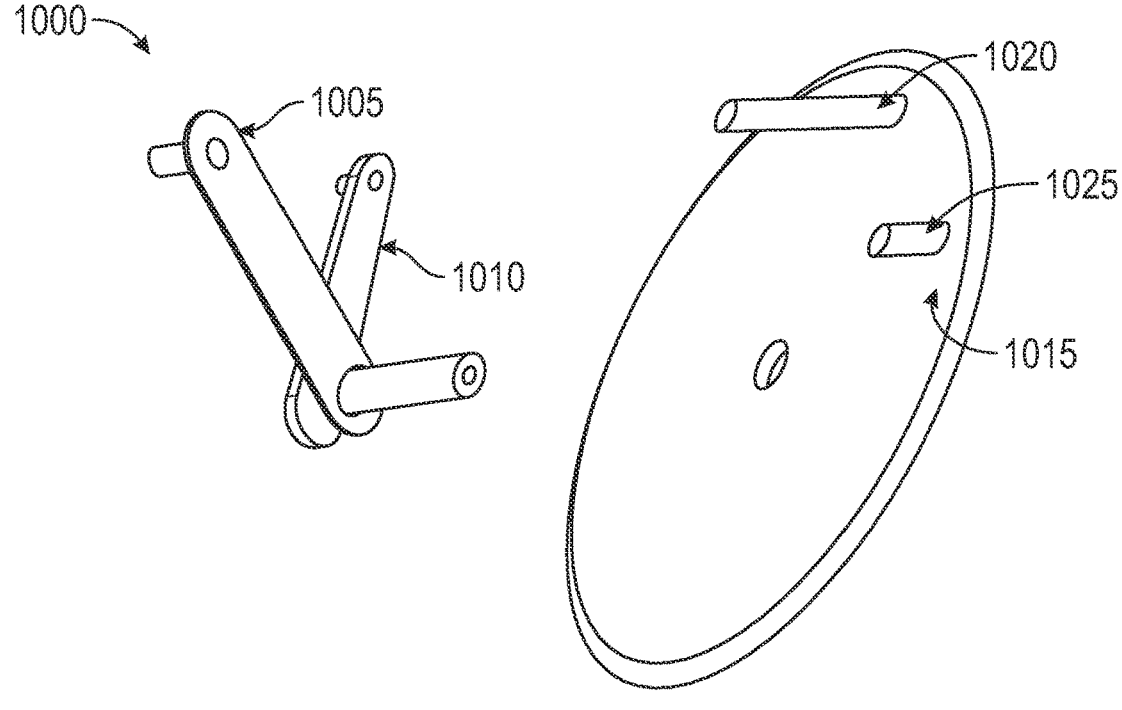
FIG. 10 depicts a drive gear assembly, in accordance with the disclosed embodiments.

FIG. 10 illustrates aspect of the drive arm system 1000, including two drive arms with different lengths, drive arm 1005 and drive arm 1010. The respective drive arms have offsets that can be attached to a drive gear 1015. The drive gear 1015 can be sized so that attachments can be made at different locations. One such attachment 1020 can be closer to the center and another attachment 1025 can be further from the center. The length of the connections ensures the arms do not interfere with one another.

Figure 11:
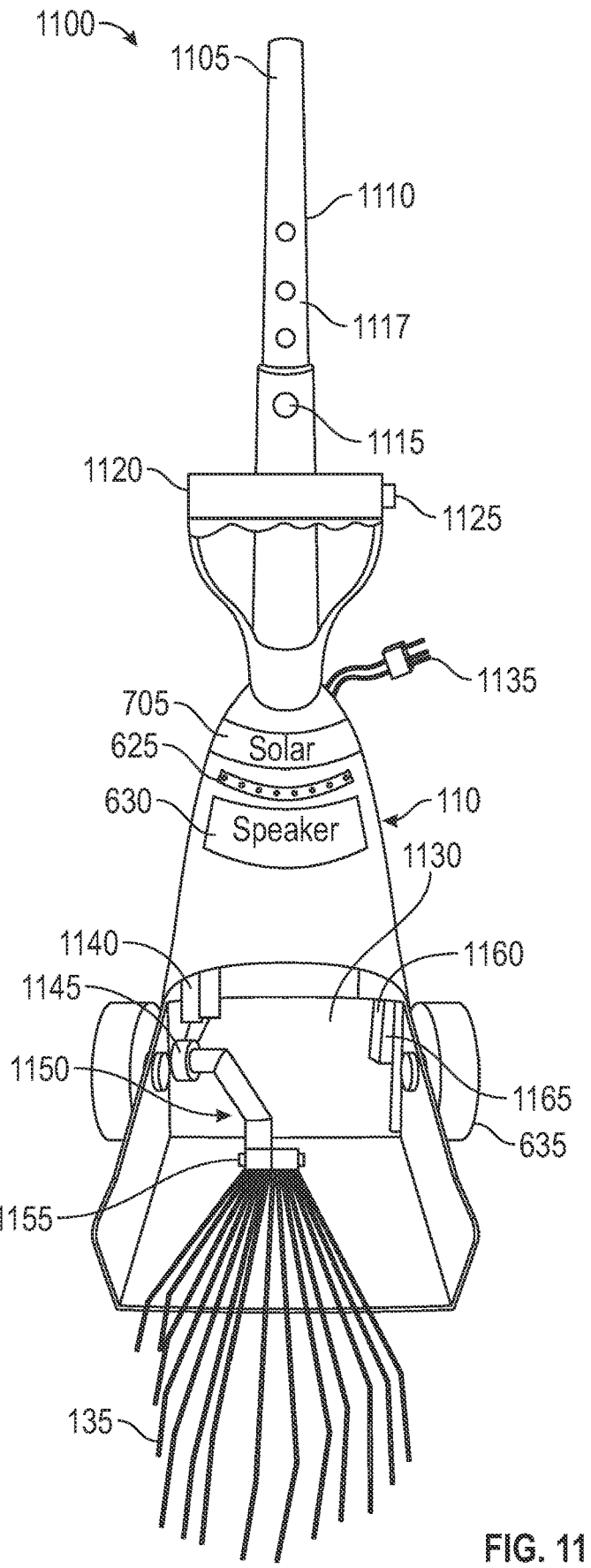
FIG. 11 depicts an embodiment of a waste collection system, in accordance with the disclosed embodiments.

FIG. 11 illustrates another embodiment of a system 1100 for collecting waste. Aspects of the system 1100 can be used in connection with any other embodiment detailed herein. In the illustrated embodiment a primary handle 1105 can be attached a telescoping handle 1110. The telescoping handle 1110 includes an inner post with a spring loaded release button 1115 configured to engage holes 1117 configured in an outer post. A secondary handle 1120 can be attached to the shovel housing 110. The secondary handle 1120 can include a release button 1125 for releasing the back door 1130 for waste disposal.

The shovel housing 110 can include a 120 Volt AC charging cable 1135 connected to a battery pack and/or power supply. The battery pack and/or power supply can be further connected to a solar collector 705 as well as an LED light bank 625 and speaker 630.

The lower section of the shovel housing can include a first motor 1140 (also connected to the power supply) on one side of the housing which is connected to a gearing sprocket 1145. The reciprocating arm 1150 is further connect to a rake joint 1155 which connects to the waste catch 135. The rake joint 1155 ensures the waste catch 135 maintains an optimal angle.

The lower section of the shovel housing 110 can further include a second motor 1160 (also connected to the power supply). The second motor 1160 is configured to drive one or more of the wheels 635. Thus, the second motor 1160 is connected to a drive gear 1165 for the wheels, which is further operably connected to the wheel(s) 635.

FIGS. 12A-12E illustrate aspects of another embodiment of a waste collection system 1200. The system 1200 can generally comprise a waste collection assembly 1205 and a handle assembly 1210. The handle assembly 1210 can include a telescoping stand tube 1215 and handle 1220. The handle 1220 is fitted with controls 1225 for various functions of the system 100.

Figure 12A:
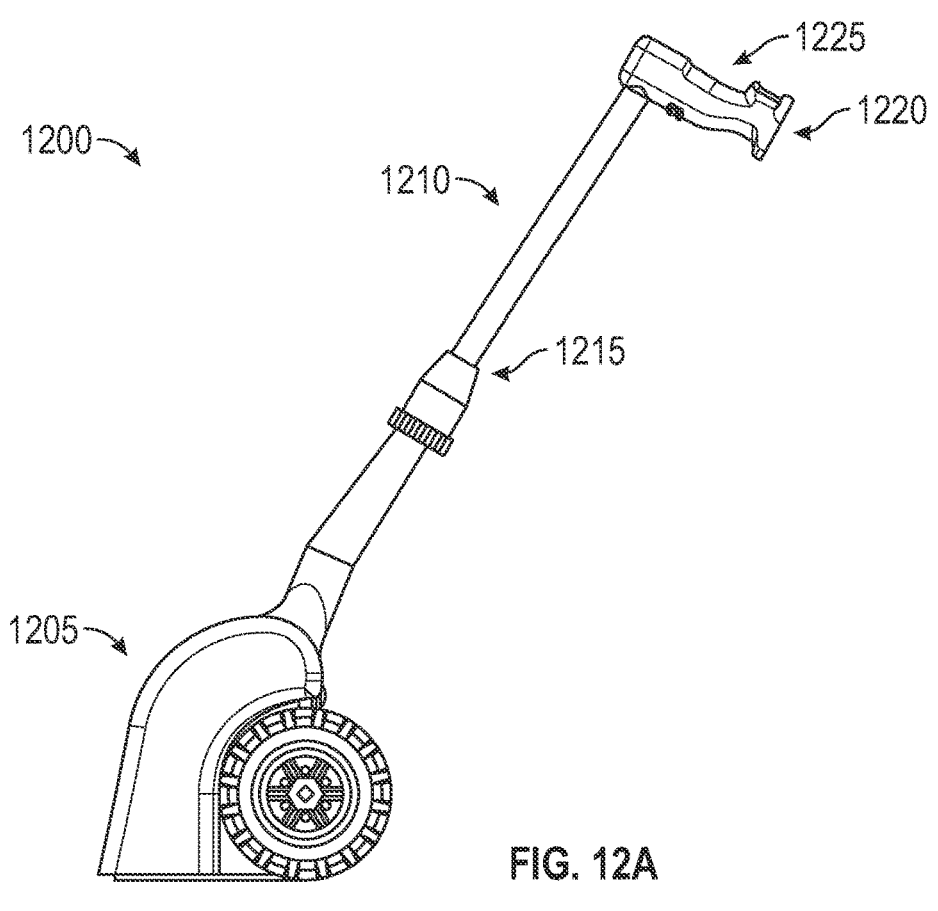
FIG. 12A depicts another embodiment of a waste collection system, in accordance with the disclosed embodiments.
Figure 12B:
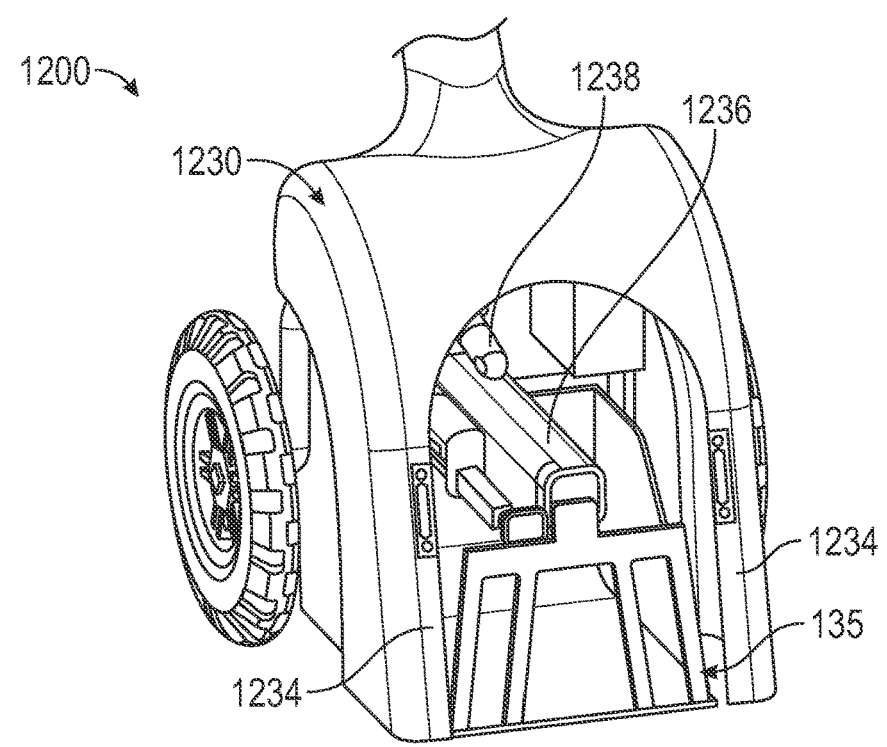
FIG. 12B depicts aspects of a waste collection assembly, in accordance with the disclosed embodiments.

The waste collection assembly 1205 is illustrated in FIG. 12B. The waste collection system 1205 mounts to the handle assembly 1210. The waste collection system 1205 can include a housing 1230 and waste slide container 1232. Lights 1234 can be mounted to the front of the housing 1230, or at other desired locations. In certain embodiments, the lights 1234 can comprise weather resistant lighting covers and/or waterproof LEDs formed therein.

Figure 12C:
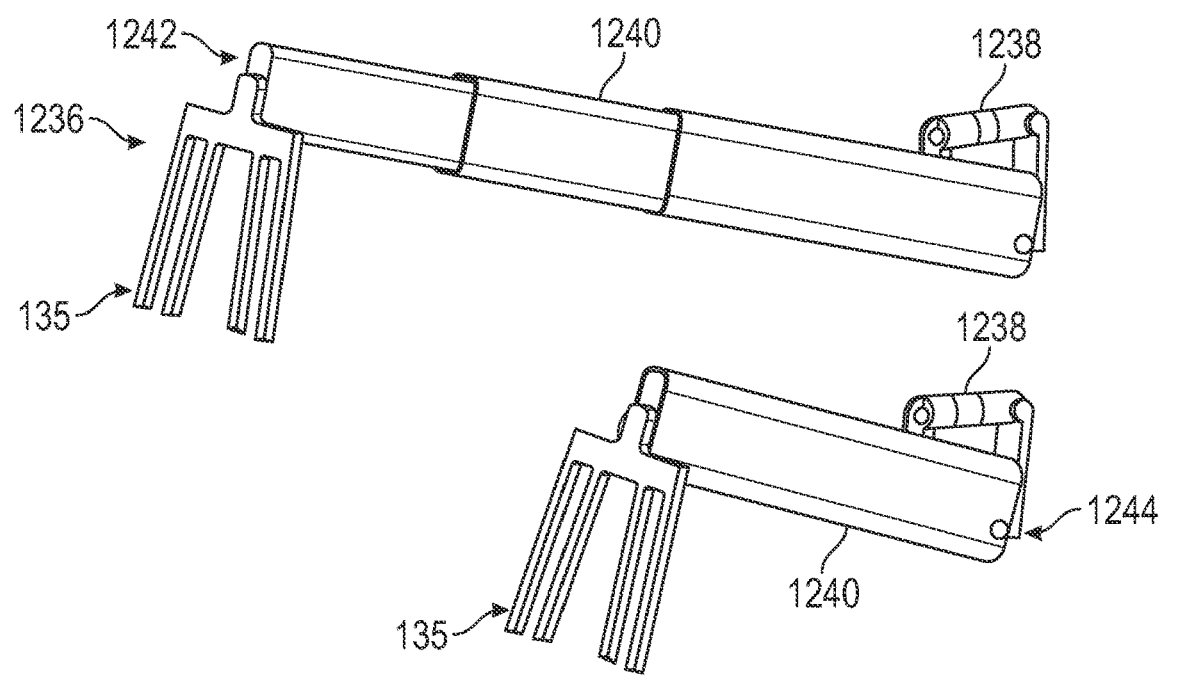
FIG. 12C depicts a slide bar arm associated with a waste collection system, in accordance with the disclosed embodiments.

The waste catch 135 can be connected to a sliding arm bar 1236. The sliding arm bar 1236 comprises a telescopic arm 1240 connected to angle solenoid 1238. Aspects of the telescopic sliding arm bar 1236 are illustrated in FIG. 12C. FIG. 12C illustrates the sliding arm bar 1236 in an extended configuration 1242 and a retracted position 1244.

Figure 12D:
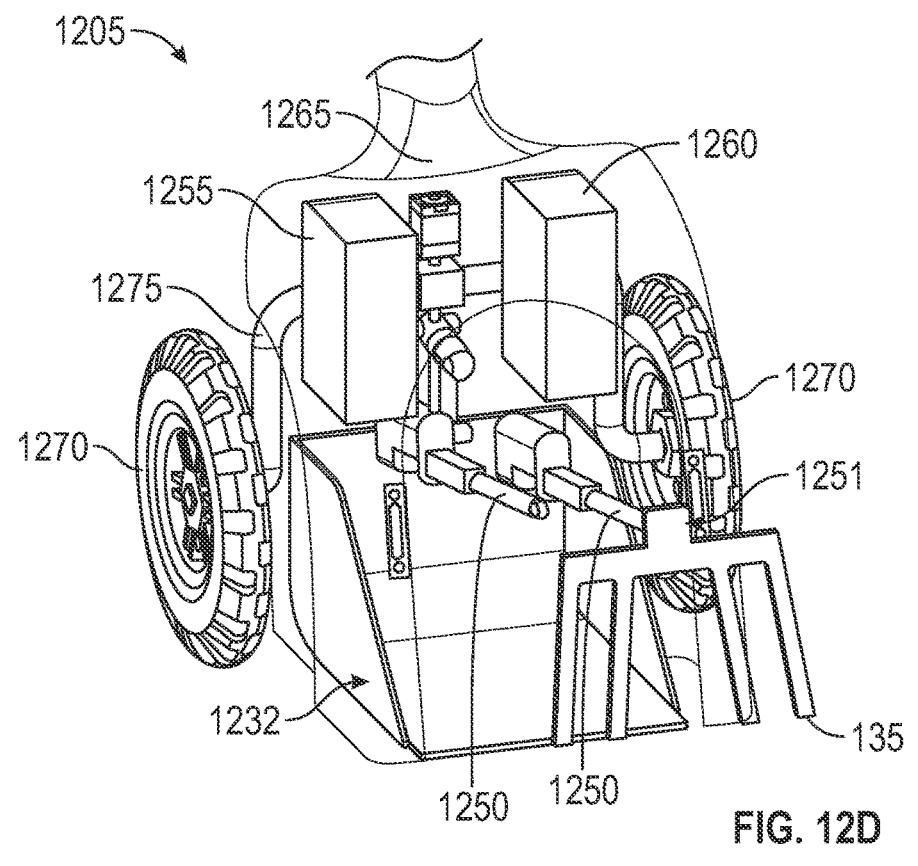
FIG. 12D depicts aspects of a waste collection assembly, in accordance with the disclosed embodiments.

FIG. 12D illustrates additional aspects of the waste collection system 1205. The waste collection system 1205 a printed circuit board (PCB) 1255 operably connected to the controls 1225, as well as battery 1260. The PCB 1255 can be used to control linear actuator 1250, which drives the waste catch 135 via rake joint 1251 in a pattern as illustrated in FIG. 4.

A stepper motor 1265 can be connected to the controls 1225 and the PCB 1255. The stepper motor can be used to raise or lower the wheels 1270. The wheels are connected to the stepper motor 1265 with a wheels link 1275.

Figure 12E:
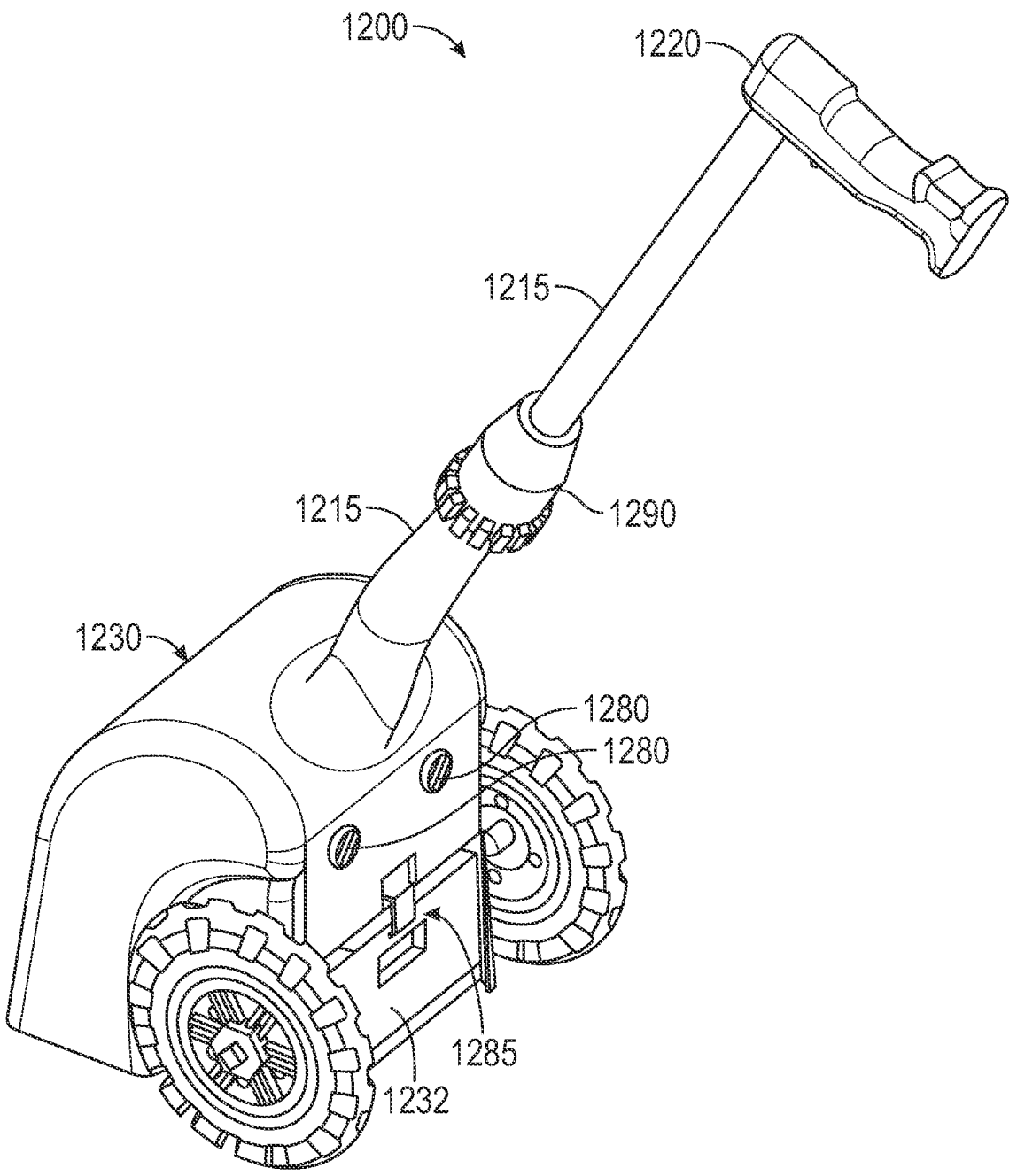
FIG. 12E depicts aspects of a waste collection assembly, in accordance with the disclosed embodiments.

FIG. 12E illustrates additional aspects of the system 1200. As illustrated, speakers 1280 can be provided on or in the housing 1230. The speakers 1280 can be connected to a radio device including a mobile device or other such system. The connection can be via Bluetooth, or other such wireless connection provided by PCB 1255.

The system 1200 can further include a waste tray 1232 configured to connect with the housing 1230. The waste tray 1232 is configured with a latch 1285 so that it can be removed when it is filled with waste. In addition, segments of the telescoping stand tube 1215 can be connected with twist lock 1290.

The disclosed embodiments are thus directed to a system for collecting waste. The system is useful in that it reduces the time it takes to pick up feces that have been deposited on the ground in various terrain. Furthermore, the system can be mechanized reducing physical effort for the operator. In addition, the system decreases user contact with soiled surfaces, can be cleaned and thus improves sanitation during the collection of fecal material or other waste. The system is also sufficiently simple so that it can be operated with one hand, and can be operated at night using the light bank for illumination.

Based on the foregoing, it can be appreciated that a number of embodiments, preferred and alternative, are disclosed herein. In an embodiment, a waste collection system comprises a shovel housing, a shovel slide, a waste catch, and a drive train operably connected to a power supply and configured to drive the waste catch through a series of positions.

In an embodiment, the system comprises a handle and at least one controller for operating the drive train, wherein the controller is configured on the handle. In an embodiment, the system comprises at least one wheel configured on the shovel housing. In an embodiment, the system comprises a light configured on the shovel housing. In an embodiment, the system comprises at least one door configured on the shovel housing. In an embodiment, the waste catch further comprises a plurality of fingers. In an embodiment, the system comprises at least one speaker on the shovel housing. In an embodiment, the system comprises a guide arm operably connected to the waste catch, the guide arm configured to guide motion of the waste catch.

In an embodiment, the power supply comprises a battery. In an embodiment, the system further comprises a 120 Volt AC charging cable configured to connect to the battery.

In another embodiment a waste collection system comprises a handle assembly comprising: a stand tube, a handle, and a controller; and a waste collection assembly comprising: a housing, a waste slide container, a sliding arm bar operably connected to a waste catch with a linear actuator, wherein the waste catch is configured to draw waste into the waste slide container.

In an embodiment, the system comprises a printed circuit board configured to control movement of the linear actuator. In an embodiment, the system comprises a light configured on the housing. In an embodiment, the system comprises a speaker configured on the housing. In an embodiment, the system comprises a solenoid operably connected to the sliding arm bar. In an embodiment, the system comprises a wheels link connecting the waste collection assembly to at least one wheel. In an embodiment, the system comprises a stepper motor configured to raise and lower the wheels link and the wheels. In an embodiment, the system comprises a rake joint connecting the sliding arm bar to the waste catch.

In another embodiment a system comprises a handle, a stand tube connected to a housing, a waste slide container, and a waste catch configured to draw waste into the waste slide container. In an embodiment, the system comprises a controller, a printed circuit board in operable communication with the controller and configured to control movement of the waste catch, and a power source.

It will be appreciated that variations of the above-disclosed and other features and functions, or alternatives thereof, may be desirably combined into many other different systems or applications. Also, it should be appreciated that various presently unforeseen or unanticipated alternatives, modifications, variations, or improvements therein may be subsequently made by those skilled in the art which are also intended to be encompassed by the following claims.

What is claimed is:

1. A waste collection system comprising:
   a shovel housing comprising sides configured to contain waste, and a back opening;
   a shovel slide connected to, and forming a bottom of, the shovel housing, the shovel slide configured to rest against the ground;
   a waste catch mounted to the shovel housing; and
   a motor, and a drivetrain operably connected to a power supply and configured to drive the waste catch through a series of positions.

2. The waste collection system of claim 1 further comprising:
   a handle connected to the shovel housing; and
   at least one controller for operating the drive train, wherein the controller is configured on the handle.

3. The waste collection system of claim 1 further comprising:
   at least one wheel configured on the shovel housing, configured to allow the waste collection system to roll.

4. The waste collection system of claim 1 further comprising:
   a light configured on the shovel housing.

5. The waste collection system of claim 1 further comprising:
   at least one door configured on the shovel housing.

6. The waste collection system of claim 1 wherein the waste catch further comprises:
   a plurality of fingers.

7. The waste collection system of claim 1 further comprising:
   at least one speaker on the shovel housing.

8. The waste collection system of claim 1 further comprising:
   a guide arm operably connected to the waste catch, the guide arm configured to guide motion of the waste catch.

9. The waste collection system of claim 1 wherein the power supply comprises a battery.

10. The waste collection system of claim 9 further comprising:
    A 120 Volt AC charging cable configured to connect to the battery.

11. A waste collection system comprising:
    a handle assembly comprising:
        a handle;
        a stand tube connected to, and extending from, the handle; and
        a controller configured on the handle; and
    a waste collection assembly connected to the handle assembly, the waste collection assembly comprising:
        a housing connected to the stand tube;
        a waste slide container configured inside the housing; and
        a sliding arm bar operably connected to a waste catch with a linear actuator, wherein the waste catch is configured to draw waste into the waste slide container.

12. The waste collection system of claim 11 further comprising:
    a printed circuit board configured to control movement of the linear actuator.

13. The waste collection system of claim 11 further comprising:

a light configured on the housing.

14. The waste collection system of claim 11 further comprising:

a speaker configured on the housing.

15. The waste collection system of claim 11 further comprising:

a solenoid operably connected to the sliding arm bar.

16. The waste collection system of claim 11 further comprising:

a wheels link connecting the waste collection assembly to at least one wheel.

17. The waste collection system of claim 16 further comprising:

a stepper motor configured to raise and lower the wheels link and the wheels.

18. The waste collection system of claim 11 further comprising:

a rake joint connecting the sliding arm bar to the waste catch.

19. A system comprising:

a handle;

a stand tube extending from the handle and connected to a waste collection assembly housing;

a waste slide container configured inside the housing; and a waste catch operably connected to a linear actuator, the waste catch configured to draw waste into the waste slide container within the housing.

20. The system of claim 19 further comprising:

a controller;

a printed circuit board in operable communication with the controller and configured to control movement of the waste catch; and a power source.

* * * * *